United States Patent [19]

Kleinert, III et al.

[11] Patent Number: 5,358,798
[45] Date of Patent: Oct. 25, 1994

[54] BATTERY ASSEMBLY HAVING A THERMAL FUSE

[75] Inventors: Raymond J. Kleinert, III, Ft. Lauderdale; Michael P. Cicci, Coral Springs; Russell E. Gyenes, Sunrise, all of Fla.

[73] Assignee: Motorola, Inc., Schaumburg, Ill.

[21] Appl. No.: 161,626

[22] Filed: Dec. 6, 1993

[51] Int. Cl.⁵ .............................................. H01M 2/34
[52] U.S. Cl. .......................................... 429/7; 429/62
[58] Field of Search ................... 429/7, 61, 62, 90; 337/298, 300, 317, 318, 389, 390, 415

[56] References Cited

U.S. PATENT DOCUMENTS

| | | |
|---|---|---|
| 3,638,083 | 1/1972 | Dornfeld et al. |
| 4,011,366 | 3/1977 | Bones et al. ............... 429/61 |
| 4,188,460 | 2/1980 | Kang et al. ............... 429/7 |
| 4,494,104 | 1/1985 | Holmes . |
| 4,652,848 | 3/1987 | Hundrieser . |
| 4,992,339 | 2/1991 | Georgopoulos ........... 429/7 |
| 5,097,247 | 3/1992 | Doerrwaechter . |
| 5,130,689 | 7/1992 | Raykhtsaum et al. . |
| 5,180,644 | 1/1993 | Bresin et al. ............ 429/98 |
| 5,188,909 | 2/1993 | Pedicini ................. 429/62 X |
| 5,196,819 | 3/1993 | Roberts . |
| 5,204,194 | 4/1993 | Miller et al. .......... 429/61 X |

*Primary Examiner*—Anthony Skapars
*Attorney, Agent, or Firm*—Pedro P. Hernandez

[57] ABSTRACT

A battery assembly (10) includes at least one battery cell (12) and a circuit carrier (15) in thermal proximity to the at least one battery cell (12). Located on circuit carrier (15) is a thermal fuse (18) which is formed from an electrically conductive resilient material such as beryllium copper. At least one end of the thermal fuse is coupled in a deflected state to a solder pad (20) located on circuit carrier (15) using a low temperature conductive adhesive such as low temperature solder (24). When the temperature of the at least one battery cell (12) reaches a predetermined trip point, the one end of the thermal fuse releases away from solder pad (20) due to the heat transfer from the at least one battery cell, thereby electrically disconnecting the at least one battery cell (12) from battery terminal (23).

13 Claims, 2 Drawing Sheets

BATTERY ASSEMBLY HAVING A THERMAL FUSE

TECHNICAL FIELD

This invention relates in general to battery assemblies, and more specifically to a battery assembly having a thermal fuse.

BACKGROUND

Battery assemblies (or battery packs) which are used in conjunction with electronic devices (e.g., two-way radios, cellular telephones, etc.) typically include a thermal fuse as part of the battery assembly. The thermal fuse is used to protect the battery cells inside of the battery assembly from getting too hot while being charged, and thereby avoids the possibility of the battery cells exploding when a battery pack or charger malfunction occurs. Such malfunctions can include conditions such as the battery assembly experiencing a short circuit which causes the battery cells to overheat, or a malfunction occurs with the battery charger that is charging the battery assembly, etc.

Present day battery fuses however suffer from some problems. One major problem of current fuses is that they are too big and heavy. With the movement in the electronics industry for smaller and lighter electronic devices, any reduction in size and weight is a welcomed benefit. Another major problem with currently used fuses is that they are too expensive. A fuse that could be inexpensive and yet provide the same benefits would help provide for more cost competitive products. Finally, some fuses that are currently used in battery assemblies have component leads and require hand placement and soldering, which takes up manufacturing time, and increases the cost of the final battery pack. As shown, a need exists in the art for an improved thermal fuse for use in battery assemblies.

DETAILED DESCRIPTION OF THE PREFERRED EMBODIMENT

Figure 1:
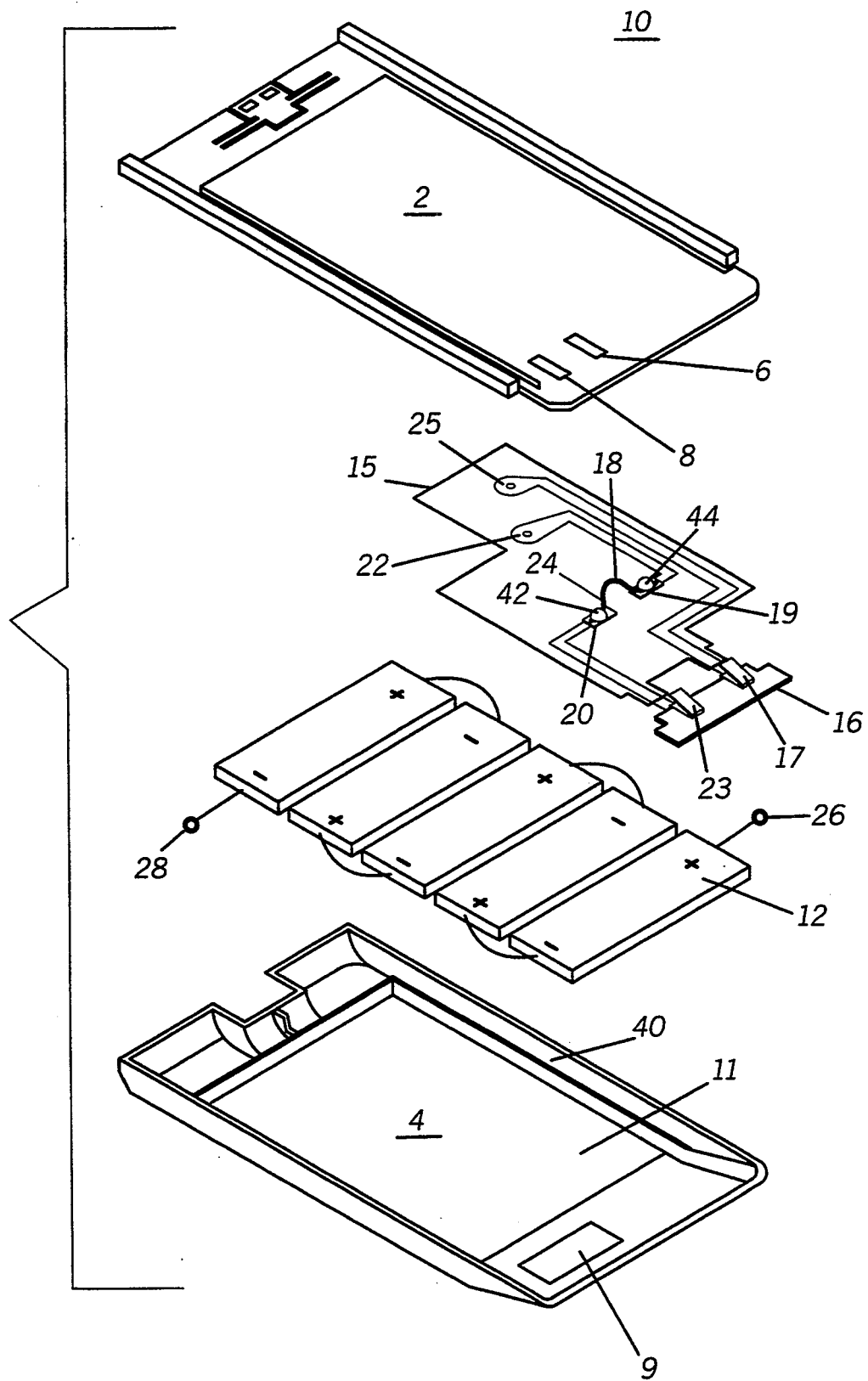
FIG. 1 is an exploded view of a battery assembly in accordance with the invention.

While the specification concludes with claims defining the features of the invention that are regarded as novel, it is believed that the invention will be better understood from a consideration of the following description in conjunction with the drawing figures, in which like reference numerals are carried forward.

FIG. 1 shows an exploded view of a battery assembly (or battery pack) 10 in accordance with the invention. Battery pack 10 comprises first housing member 4 having an aperture 9 and a second housing member 2 which includes apertures 6 and 8. First and second housing members 4 and 2 are mechanically connected to each other in order to form the overall housing for battery assembly 10. First housing member includes a side wall 40 and bottom surface 11. The two housing members can be mechanically connected together using a variety of well known interconnection techniques such by ultra-sonic welding the two housing members together, using adhesives, etc. Located between the two battery housing members are a set of rechargeable battery cells 12. In this example, battery cells are shown as rechargeable prismatic cells having a flat shape, although cylindrical and all other types of battery cells can also be used with the present invention. Preferably, the plurality of cells 12 are interconnected to each other serially as is well known. In FIG. 1, the battery to battery interconnections and the insulative coverings used to insulate the battery cells 12 from each other are not shown in order to highlight the present invention.

Also located between the two housing members 2 and 4 is a circuit carrier such as a flexible circuit carrier 15 used to electrically couple the serially connected battery cells to battery terminals 17 and 23. Flexible circuit carrier 15 lies flush against battery cells 12 upon battery pack 10 being assembled. Flexible circuit carrier 15 can be formed from a number of known materials such as polyimide, mylar, etc. Preferably, circuit carrier 15 is formed from two layers of polyimide which are bonded together using well known techniques with the circuit carriers (traces) located between the two layers. Although preferably circuit carrier 15 is flexible and conforming in order to be easily placed in the tight confines inside of battery assembly 15, rigid circuit carriers can also be used depending on the design of the battery assembly.

Flexible circuit carrier 15 includes a first metallized land area or solder pad 25 for interconnecting the negative battery terminal 28 of the serially connected battery cells 12. Solder pad 25 is in turn electrically interconnected via a conductor in flexible circuit 15 to negative battery assembly contact 17. A second solder pad 22 is interconnected to the positive battery terminal 26 of the serially interconnected battery cells 12. An electrical conductor located on flexible circuit 15 electrically interconnects solder pad 22 to positive battery assembly 23. Battery assembly contacts 17 and 23 are preferably resilient metal fingers which protrude from apertures 6 and 8 located on second housing member 2 once the two housing members are connected together. Battery assembly contacts 17 and 23 allow for the interconnection of battery pack 10 to an external electronic device such as a radio or other battery operated device. Battery assembly contacts 17 and 23 are held in place by an insulative member 16 which includes corresponding charging contacts (not shown) to battery assembly contacts 17 and 23 on its opposed surface. These charging contacts can be reached via aperture 9 when battery assembly 10 is manufactured, and can be interconnect to a battery charger for charging battery cells 12.

Located on flexible circuit 15 is a thermal fuse 18 which is preferably comprised of a piece of beryllium copper or other electrically conductive resilient material which is able to be spring loaded, such as spring metals, etc. The piece of beryllium copper is bent with one end being soldered to solder pad 19 using high melting point solder 44 having a melting point of approximately 220 degrees Celsius, although a solder having a melting point in the range of 200–245 degrees Celsius would be acceptable in the preferred embodiment. The other end of the thermal fuse is soldered to solder pad 20 using a low temperature solder 42 such as a solder having a melting point in the range of approximately 90–115 degrees Celsius. Although the specific temperature ranges for the high and low melting point solder have been specified for the preferred embodiment, those skilled in the art will realize that these ranges can be modified based on several factors such as the operating temperature battery pack 10 will experience, etc. Although solder has been discussed as the preferred agent for mechanically coupling thermal fuse 18 to circuit carrier 15, any other known temperature sensitive adhesive can be used to couple thermal fuse 18 to flexible circuit 15.

Thermal fuse 18 should be soldered onto circuit carrier 15 under tension, so that when the temperature of the thermal fuse reaches approximately 100 degrees Celsius, spring arm 24 which is coupled to solder pad 20 can spring out and clear the electrically conductive area of solder pad (metallized land area) 20. This can be accomplished by soldering one end of the thermal fuse to circuit carrier and then using a manufacturing fixture to place the piece of beryllium copper under tension in a deflected state before soldering the other end using the low temperature solder, or by using any other of known manufacturing techniques which are available.

As discussed above, thermal switch 18 is preferably formed from a piece of beryllium copper. The piece of beryllium copper preferably has a circular cross-section having a diameter of 0.006 inch (0.015 centimeter) with the spring-out arm portion 24 of fuse 18 having a preferable length of approximately 0.5 inch (1.27 centimeter). The spring-out arm portion 24 of fuse 18 should be able to have a deflection of approximately 0.120 inch (0.3048 centimeter) when the low temperature solder reaches its melting point. This allowing for enough deflection to clear solder pad 20 which avoids any reconnection of arm portion 24 to solder pad 20.

Figure 2:
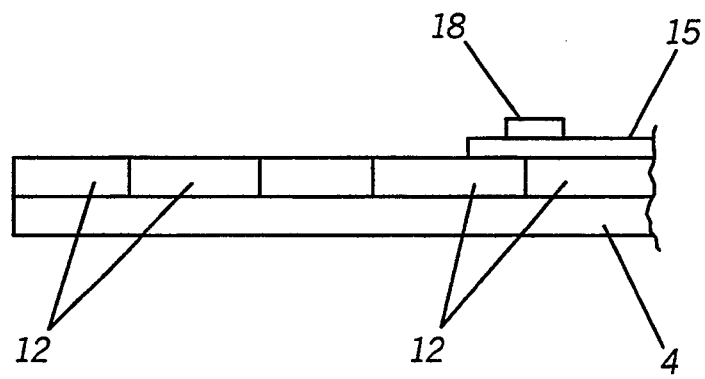
FIG. 2 is a cross-sectional side view of a portion the battery assembly shown in FIG. 1.

Referring now to FIG. 2, a cross-sectional side view of a portion of battery assembly 10 is shown. The plurality of battery cells 12 are located on top of first housing member 4. Flexible circuit carrier 15 is located flush against battery cells 12. Flexible carrier 15 in the preferred embodiment is approximately 0.002 inch (0.00508 centimeter) thick allowing for thermal fuse 18 to be in thermal proximity to battery cells 12. By thermal proximity it is meant a distance in which the heat generated by cells 12 will have an affect on thermal fuse 18 allowing it to deploy when battery cells 12 reach a predetermined trip temperature. The heat transfer from battery cells 12 cause thermal fuse 18 to heat up until it reaches the thermal fuse's trip temperature. In this particular example the predetermined trip temperature for fuse 18 is approximately 100 degrees Celsius. Thermal fuse 18 should preferably be no more than 0.008 inch (0.0203 centimeter) away from the top of battery cells 12. It is also preferable that thermal fuse 18 rest over at least two battery cells as shown in FIG. 2. This allows for a better temperature reading of battery cells 12 and also allows for extra security in the case one of the battery cells is no longer operational and can no longer heat up.

Figure 3:
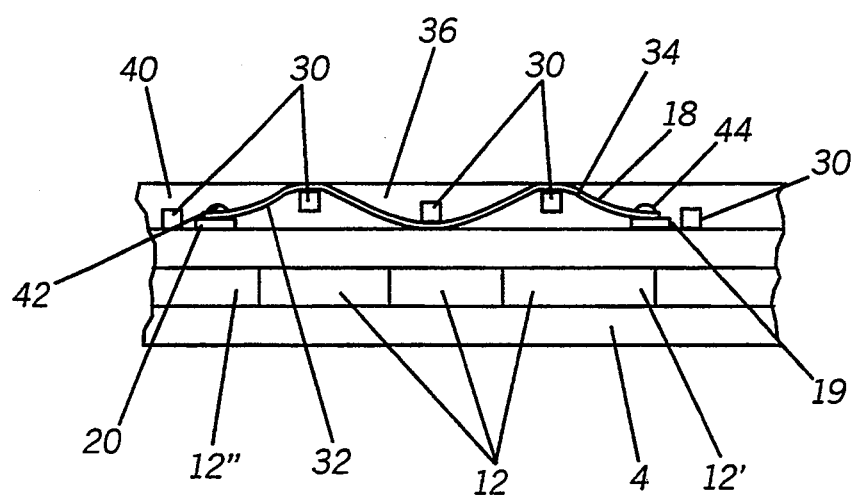
FIG. 3 shows a cross-sectional side view portion of a second embodiment of a battery assembly in accordance with the invention.

In FIG. 3 a second embodiment of the present invention is shown. In this embodiment thermal fuse 36 is retained to first housing member 4 with a retention means such as a set of plastic support members or fingers 30 which extend from the side wall 40 of housing member 4. Support members 30 are formed parallel to bottom surface 11 of housing member 4 and are preferably molded as part of the first housing member 4 and are approximately 0.5 inch (0.1.27 centimeter) long. Plastic support members 30 help retain thermal fuse 36 and also provide mechanical biasing force to spring-away end members 32 and 34.

Support members 30 guarantee that spring-away end member 32 and 34 clear solder pads 19 and 20 since they add upward force to thermal fuse at end members 32 and 34. Support members 30 also prevents thermal fuse 36 from becoming loose within battery assembly 10 and allow for low temperature solder to be used at both ends of thermal fuse 36, since thermal fuse 36 is retained by the support members 30. This allows for the spring-away portions 32 and 34 to be located over different battery cells (12' and 12") which allows for better temperature sensing of battery cells 12 and provides for a better chance that thermal fuse 36 will trip at the appropriate trip temperature.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery assembly, comprising:
  a battery assembly contact;
  at least one battery cell having a battery terminal;
  a circuit carrier having first and second metallized land areas; and
  a thermal fuse located on the circuit carrier and in thermal proximity to the at least one battery cell, the thermal fuse electrically coupling the battery assembly contact with the battery terminal, the thermal fuse comprising:
    a resilient electrically conductive member having first and second ends, the first end being attached to the first metallized land area using low temperature solder and the second end being attached to the second metallized land area, the resilient electrically conductive member being attached so that the first end of the resilient electrically conductive member springs away from the first metallized land area causing the electrical interconnection between the battery assembly contact and the battery terminal to be disconnected in response to the at least one battery cell generating enough heat to raise the temperature of the thermal fuse above a predetermined temperature.

2. A battery assembly as defined in claim 1, wherein the resilient electrically conductive member comprises a piece of wire.

3. A battery assembly as defined in claim 2, wherein the second end is attached to the second metallized land area using high temperature solder.

4. A battery assembly as defined in claim 2, wherein the circuit carrier comprises a flexible circuit carrier which is placed against the at least one battery cell.

5. A battery assembly as defined in claim 2, wherein the battery assembly includes at least two battery cells and the thermal fuse is in thermal proximity to the at least two battery cells.

6. A battery assembly as defined in claim 2, wherein the piece of wire is formed from beryllium copper.

7. A battery assembly as defined in claim 3, further comprising:
  a housing member which mechanically biases the flexible circuit carrier against the at least one battery cell.

8. A battery assembly, comprising:
  a battery housing having a retention means;
  a battery assembly contact;

at least one battery cell having a battery terminal;

a circuit carrier having first and second metallized land areas; and a thermal fuse located on the circuit carrier and in thermal proximity to the at least one battery cell, the thermal fuse electrically coupling the battery assembly contact with the battery terminal, the thermal fuse comprising:

a resilient electrically conductive member having first and second ends, the first end being attached to the first metallized land area using low temperature solder and the second end being attached to the second metallized land area, the resilient electrically conductive member being biased by the retention means so that the first end of the resilient electrically conductive member springs away from the first metallized land area causing the electrical coupling between the battery assembly contact and the battery terminal to be disconnected in response to the at least one battery cell generating enough heat to raise the temperature of the thermal fuse above a predetermined temperature.

9. A battery assembly as defined in claim 8, wherein the retention means comprises a plurality of support members which retain the resilient electrically conductive member.

10. A battery assembly as defined in claim 9, wherein the second end of the electrically conductive member is attached to the second metallized land area using low temperature solder.

11. A battery assembly as defined in claim 9, wherein the plurality of support members bias the first and second ends of the resilient electrically conductive member away from the circuit carrier.

12. A battery assembly as defined in claim 9, wherein the resilient electrically conductive member comprises a piece of wire.

13. A battery assembly as defined in claim 12, wherein the piece of wire comprises beryllium copper.

* * * * *